United States Patent [19]

Hiers

[11] Patent Number: 4,522,876
[45] Date of Patent: Jun. 11, 1985

[54] INTEGRAL TEXTILE COMPOSITE FABRIC
[75] Inventor: John J. Hiers, Elkin, N.C.
[73] Assignee: Lydall, Inc., Manchester, Conn.
[21] Appl. No.: 627,688
[22] Filed: Jul. 5, 1984
[51] Int. Cl.³ .............................................. B32B 15/00
[52] U.S. Cl. ...................................... 428/285; 28/107;
  55/DIG. 26; 428/234; 428/246; 428/280;
  428/282; 428/284; 428/287; 428/300; 428/301
[58] Field of Search ................ 151/148; 428/280, 282,
  428/284, 285, 286, 287, 300, 301, 234, 235, 246,
  247, 253; 28/107; 55/DIG. 26

[56] References Cited
U.S. PATENT DOCUMENTS

| | | | |
|---|---|---|---|
| 2,794,237 | 6/1957 | Dildelian et al. | 428/300 |
| 2,794,238 | 6/1957 | Dildelian et al. | 428/300 |
| 2,794,759 | 6/1957 | Dildelian | 428/300 |
| 2,910,763 | 11/1959 | Lauterbach | 428/300 |
| 3,975,565 | 8/1976 | Kendall | 428/300 |
| 4,277,531 | 7/1981 | Picone | 428/300 |

Primary Examiner—James J. Bell
Attorney, Agent, or Firm—Murray, Whisenhunt & Ferguson

[57] ABSTRACT

There is provided an integral textile composite fabric of non-woven, needled textile fibers which comprises at least one organic textile fiber layer of laid and needled textile organic fibers, at least one glass fiber layer of laid and needled glass fibers, and a plurality of needled stitches composed essentially of the organic fibers from the organic fiber layer needled in and disposed substantially through the glass fiber layer. The layers are bound together at their inner surfaces, are substantially non-detachable from each other and form an integral textile composite fabric having substantially uniform and high physical properties. There are at least 700 stitches per square inch passing through the glass fiber layer, and the organic fiber layer is essentially free, at least on the outer surface thereof, of glass fibers displaced from the glass fiber layer.

26 Claims, 5 Drawing Figures

INTEGRAL TEXTILE COMPOSITE FABRIC

The present invention relates to an integral textile composite fabric of non-woven, needled textile fibers, and more particularly to such a composite having at least one organic textile fiber layer and at least one glass fiber layer where the layers are substantially non-detachable from each other and where the organic fiber layer is essentially free, at least on its outer surface, of glass fibers from the glass fiber layer.

BACKGROUND OF THE INVENTION

Needled textile fabrics are normally composed of synthetic organic textile fibers, e.g. polyester, nylon, acrylic, etc., or other synthetic organic fibers, needled together into a consolidated mat. While such fabrics may also be made of natural organic fibers, e.g. cotton, hemp, wool, etc., these natural fibers are capable of being formed into a non-woven fabric of substantial properties by the more traditional process, e.g. felting, and hence, are not usually needled to form a non-woven fabric. Inorganic fibers, on the other hand, and especially glass fibers, are not normally either felted or needled, but are consolidated into a fabric of, generally, low physical properties by an air lay or wet lay process. This is because inorganic fibers, by virtue of the materials and process of producing, have very little crimp therein, are of high modulus and substantially brittle, all of which do not lend the inorganic fibers to being either carded, needled or felted. U.S. Pat. No. 3,608,166, for example, details the difficulties in needling glass fibers. Limited needling has been done, however, for the purpose of lightly tacking a glass fiber batt.

U.S. Pat. No. 3,338,777 teaches that the ability to needle glass fibers can be improved by crimping those fibers, but this is quite unacceptable from a commercial point of view because of the cost thereof.

Thus, most needled fabrics, being composed generally of synthetic organic fibers, find a variety of applications where relatively high physical properties are required, e.g. high strengths, with substantially uniform physical properties in both the longitudinal and widthwise direction, and particularly in those applications where economics dictate the use of materials less expensive than woven fabrics or where the applications require more uniform thickness direction properties than woven fabrics, e.g. as a filter media or as a heat insulator. However, since such needled fabrics are generally restricted to synthetic organic fibers, the application of these needled fabrics has been substantially limited when higher temperatures are involved. In addition these needled fabrics have also been limited in applications where filtration requirements are such that the synthetic organic fibers are not of sufficiently small denier to achieve high particulate filtration. Thus, the normal needled fabrics suffer from considerable disadvantages in these regards.

The art has attempted to overcome these disadvantages by use of a number of different approaches. In one approach, high temperature and finer denier synthetic organic fibers have been used to produce the needled fabric, but this solution results in only improved properties, based on the properties of the fibers used, and does not avoid the difficulties associated with the use of synthetic organic fibers, as explained above. For example, the finest denier synthetic organic fiber commercially available in the United States is 1.5 denier. In addition these high temperature and finer denier organic fibers are expensive and their use cannot be accepted in many commercial applications.

Another approach in the art, as exemplified by U.S. Pat. No. 3,338,777, has been that of mixing together organic fibers and glass fibers. Such a mixture of fibers significantly improves the ability to needle the glass fibers into a consolidated fabric of reasonable physical properties. However, this approach suffers from the disadvantage that the mixture of organic fibers and glass fibers decreases the resulting physical properties of the resulting fabric, as opposed to an all organic fiber fabric, due to the increased difficulty of needling the glass fibers into a fabric of high strengths. In addition this approach does not solve the filtration problem. For example, finer particulate filtration is achieved when there is provided a relatively homogeneous layer of finer diameter fibers, e.g. glass fibers, than when such a layer is a mixture of such finer diameter fibers and large diameter fibers, e.g. conventional synthetic organic fibers.

Aside from the foregoing difficulties in resulting properties, a needled mixture of organic fibers and glass fibers has recently been determined to have a most undesired health problem. In needling the mixture, glass fibers may be disposed throughout the thickness of the needled fabric, and including the surfaces thereof. The co-needling of the organic fibers and glass fibers, nevertheless, breaks many of the low stretchable and brittle glass fibers. These very small broken glass fibers are easily displaceable from the surface of the fabric when the fabric is in use and the displaced broken (as well as unbroken) glass fibers will freely float in the air. If workers inhale these broken glass fibers, serious lung damage can result. Accordingly, for safety sake, use of such fabrics is considerably discouraged, or even prohibited, in many industries.

None of the above approaches in the art have produced satisfactory results, and, generally speaking, needled fabrics are only normally composed of organic synthetic fibers, and these fabrics have limitations on their application, as explained above.

An attempt at a different approach is disclosed in U.S. Pat. No. 3,608,166, where organic fibers are used to needle "connecting" fibers through a glass fiber mat, preferably reinforced with a woven fabric, but that patent recommends oiling the glass fibers to avoid the problem of breakage and teaches using only about 12 to 15 needle punches per square centimeter. This is an unacceptably low number of needle punches and the resulting needled mat has low strengths.

A somewhat related but different approach to that of U.S. Pat. No. 3,608,166 is disclosed in U.S. Pat. No. 3,975,565. That patent acknowledges that inorganic fibers are difficult to needle due to the relatively low stretch properties and brittleness of those fibers but goes on to disclose that it was found that inorganic fibers could be satisfactorily needled into a fabric by needle punching a combination of a mat of inorganic fibers and a web of organic fibers when the web of organic fibers is of a small thickness compared to the thickness of the mat of the inorganic fibers. During the needling process, the organic fibers are needled into the body of the mat of inorganic fibers and therefore hold the mat of inorganic fibers to the thin web of organic fibers. This provides a layered product with one layer being that of the inorganic fibers and one thin layer being that of the organic fibers. Thus, the properties of the layer of the inorganic fibers are substantially retained, e.g. the fine particulate filtration properties, and the layer of the organic fibers serves to hold the layer of inorganic fibers in place. This approach, therefore, offered a promise of a solution of one of the problems in the art, as identified above.

However, this approach suffers from a decided disadvantage. In practice, it was found that in needling the organic fiber layer to the inorganic fiber layer, needle punches of more than 260 punches per square inch could not be tolerated, since otherwise damage to the inorganic fibers occurred and that with needle punches of more than 260 per square inch, inorganic fiber damage resulted in more than a 25% loss of the inorganic fiber layer strength. Such a low number of needle punches per square inch is not capable of producing high overall physical properties of the composite. Further, such a low number of needle punches is not capable of so needling the fibers as to produce uniform properties in the needled layers, since most of the fibers in the layers will retain the original laid orientation, as opposed to the highly entangled orientation, and hence high strength and uniform properties, achieved by high numbers of needle punches.

In addition, the considerable breakage, during needling, of the inorganic fibers, constitutes a very definite health hazard, as explained above in connection with the needled combination of organic fibers and glass fibers.

Thus, while in principle the process and product described in that patent offered promise, in practice, the low number of needle punches acceptable and the breakage of the inorganic fibers resulted in much less than a desired solution to the problem in the art.

Accordingly, it would be of substantial advantage to the art to provide a needled fabric made of a combination of a glass fiber layer and an organic fiber layer which can nonetheless be needled to high numbers of needle punches per square inch, to achieve the physical properties discussed above, while at the same time not presenting a health hazard in use of such product.

BRIEF DESCRIPTION OF THE INVENTION

It has now been discovered that a needled fabric may be prepared by needling a composite batt prepared from a glass fiber batt and an organic fiber batt with needled punches of the composite batt being at least 700 needle punches per square inch and where the needling takes place from at least the side of the composite batt having the organic fiber layer. The needling, however, must be carried out in a manner such that the glass fibers of the glass fiber batt are not substantially engaged by the barbs of the needles during the needling operation. With such lack of engagement, the needles can switch organic fibers from the organic fiber batt into and through the glass fiber batt so as to bind the organic fiber batt to the glass fiber batt, while at the same time not substantially engaging, and, hence, breaking or displacing the glass fibers of the glass fiber batt. Stated another way, the needling is carried out in such a manner that the fibers of the organic fiber batt are needled into the glass fiber batt while the fibers of the glass fiber batt are left substantially undisturbed. By such a needling technique, high numbers of needle punches may be used in the process to form a highly needled and entangled organic fiber layer while at the same time not breaking or displacing the glass fibers of the glass fiber layer. The resulting composite fabric will have uniform and high physical properties due to the high amount of needling of the organic fiber batt. Also with such high amount of needling, the stitching of the organic fibers into and through the glass fiber batt will so bind the glass fiber and the organic fiber batts that they are essentially non-detachable, one from the other. Even further, since such needling will not substantially displace glass fibers from the glass fiber batt into the organic fiber layer batt, the resulting needled organic fiber layer will be essentially free, at least on the outer surface thereof, of glass fibers. Thus, that surface avoids the health problem described above. Further, if the glass fiber batt is sandwiched between two organic fiber batts, and a similar needling takes place, from one or both sides of the sandwich, then again the resulting sandwiching organic fiber layers will not have glass fibers therein, at least on the outer surfaces thereof, and the entire resulting fabric will not pose the health problem described above.

Accordingly, and briefly stated, there is provided an integral textile composite fabric of non-woven, needled textile fibers which comprises at least one organic textile fiber layer of laid and needled textile organic fibers, which layer has an inner and outer surface. At least one glass fiber layer of laid and needled glass fibers, which layer has an inner and outer surface, is bound to the organic fiber layer by a plurality of first needled stitches composed essentially of organic fibers from the organic fiber layer. Those needled stitches are needled in and disposed substantially through the glass fiber layer so that the resulting layers are substantially non-detachable from each other and form an integral textile composite fabric having substantially uniform and high physical properties. To achieve this latter result, there must be at least 700 stitches per square inch passing through the glass fiber layer. The resulting fabric is one where the organic fiber layer is essentially free, at least on the outer surface thereof, of glass fibers displaced from the glass fiber layer.

Preferably, an additional organic fiber layer with an inner and outer surface is disposed with its inner surface adjacent the outer surface of the glass fiber layer and the stitches are also disposed in the additional organic fiber layer so that the additional organic fiber layer is likewise bound to the outer surface to the glass fiber layer, and hence, no glass fibers are present on either surface of the composite fiber.

This product is made by preparing a glass fiber batt of the glass fibers, an organic fiber batt of the organic fibers, placing the batts adjacent to each other to form a composite batt and needling the composite batt with at least 700 needle punches per square inch (in such a manner that the needles do not substantially engage the glass fibers of the glass fiber batt) and where the needling is at least from the organic fiber batt.

Other features of the invention will be apparent from the following disclosure and claims.

DETAILED DESCRIPTION OF THE INVENTION

Figure 1:
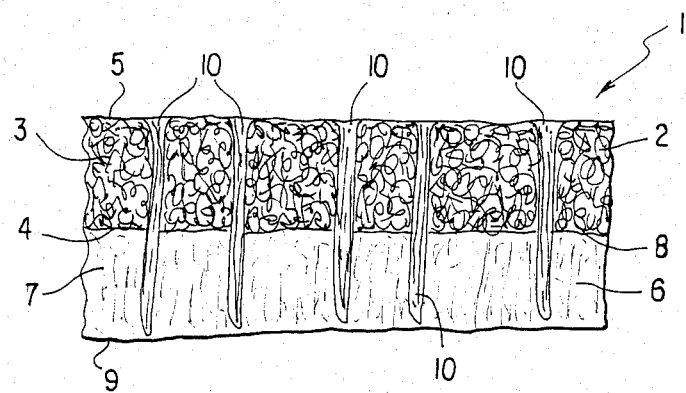
FIG. 1 is a diagrammatic illustration of a fabric according to the present invention composed of one organic fiber layer and one glass fiber layer.
Figure 2:
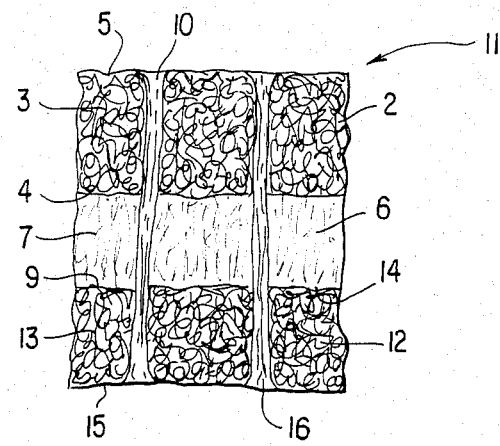
FIG. 2 is a diagrammatic illustration of the fabric of the invention composed of one glass fiber layer sandwiched between layers of organic fibers.

The invention can best be understood by first considering the diagrammatic illustrations of FIGS. 1 and 2 of the drawings. Both FIGS. 1 and 2 shown an integral textile composite fabric of non-woven needled textile fibers. From FIG. 1 it will be seen that the fabric 1 is composed of at least one organic textile fiber layer 2 of needled textile organic fibers 3, and the layer 2 has an inner surface 4 and outer surface 5. The fabric 1 also has at least one glass fiber layer 6 of glass fibers 7 and that layer has an inner surface 8 and an outer surface 9.

A plurality of first needled stitches 10 are composed essentially of organic fibers from organic fiber layer 2 and are needled in and disposed substantially through glass fiber layer 6 so that the layers are bound together at the respective inner surfaces 4 and 8. These stitches provided such binding of layers 2 and 6 that the layers are substantially non-detachable from each other and form an integral textile composite fabric. The amount of needling performed is also sufficient that the needled fabric has substantially uniform and high physical properties. To achieve these physical properties, there must be at least 700 stitches per square inch passing through glass fiber layer 6. It will also be noted from FIG. 1 that the needling is such that organic fiber layer 2 is essentially free, at least on its outer surface 5, of glass fibers displaced from the glass fiber layer 6.

Organic fiber layer 2 and glass fiber layer 6 are needled from laid fibers. Fibers may be laid into a batt for needling purposes by a variety of known processes, including drafting, air laying, wet laying, and carding. However, it is most difficult to card glass fibers into a laid batt and the more conventional air laying of glass fibers is preferred. On the other hand, it is easy to card organic fibers into a laid batt and for that reason a carded layer of the organic fibers is preferred. In any event, the layers to be needled are laid layers and are to be distinguished from previously substantially consolidated (non-laid) layers, e.g. layers which may have been substantially consolidated by use of adhesives, thermal bonding and the like. This does not mean, however, that there can be no previous consolidation of the laid layers. For example, commercially available glass fiber batts may have a small amount of resin binder therein in order to provide sufficient strength for handling purposes. Nevertheless, the glass fibers of such batts are essentially free to move and are therefore considered to be a "laid" batt.

It is necessary that the layers be laid layers so that the present needling of the organic fiber layer may take place and the fibers of the glass fiber layer are sufficiently free to avoid engagement by the barbs of the needles. It will also be appreciated from the above that the laid glass fiber layer must also be of glass fibers which are not crimped, as disclosed in U.S. Pat. No. 3,338,777, but conventional uncrimped laid glass fibers, and this is intended to be a part of the definition of "laid" glass fiber layer.

Referring now to FIG. 2, it is preferable that the composite fiber 11 have an additional organic fiber layer 12. Again, layer 12 is of needled textile organic fibers 13, which may be the same or different fibers from that of layer 2, and that layer has an inner surface 14 and an outer surface 15. Layer 12 is disposed with its inner surface 14 adjacent to the outer surface 9 of glass fiber layer 6. The stitches 10 are also disposed in additional organic fiber layer 12 so that the additional layer is likewise bound to the outer surface 9 of glass fiber layer 6.

However, it is preferred that there is also a plurality of addtional stitches 16, and again composed essentially of organic fibers from the additional organic fiber layer 12. Those stitches are needled in and disposed substantially through the glass fiber layer 6 so that the additional organic fiber layer 12 is bound to the glass fiber layer 6 at the outer surface 9 of the glass fiber layer 6 and the inner surface 14 of the additional organic fiber layer 12. This further provides that the glass fiber layer 6 and the additional organic fiber layer 12 are similarly substantially non-detachable from each other and an integral textile composite with all of layers 2, 6 and 12 is provided, which composite, again, has substantially uniform and high physical properties. The combination of first stitches 10 and additional stitches 16 should constitute the at least 700 stitches per square inch required for adequate needling and most preferably stitches 16 should constitute a significant portion of those 700 stitches per square inch. Both first stitches 10 and additional stitches 16 will pass through the glass fiber layer 6, and again additional organic fiber layer 12 will be essentially free, at least on its outer surface 15, of glass fibers displaced from glass fiber layer 6.

FIG. 2 shows the fabric where the first stitches 10 pass at least substantially through the additional organic layer 12 and additional stitches 16 pass at least substantially through the organic fiber layer 2. This is a preferred embodiment, since it provides better physical properties to the composite fabric.

While not shown in the drawings, it will be readily apparent that the composite fabric lends itself to the modification where one or more further layers of glass fibers and/or organic fibers are disposed adjacent to the outer surface 9 of the glass fiber layer 6 and these further layers likewise have stitches passing therethrough. However, in this regard it is preferred that where one or more such further layers of glass fibers and/or organic fibers are used, those further layers are disposed between organic fiber layer 2 and additional organic fiber layer 12 and likewise have stitches passing therethrough. This provides that all glass fiber layers and/or organic fiber layers, irrespective of how many are used, will be sandwiched between stitched organic fiber layers.

In regard to the fibers themselves, any of the conventional synthetic organic textile fibers may be used, e.g. thermoplastic fibers, and especially the conventional polyester fibers, acrylic fibers, polyamide fibers, including aramid fibers, polyvinyl chloride fibers, nylon fibers, poly(phenylene sulfide) fibers, polybenzoimidazole fibers and olefin fibers. Optionally, although not preferred the organic fibers may be natural fibers, e.g. wool, cotton, hemp. In addition, mixtures of the foregoing organic fibers may be used, although it is preferred that synthetic organic fibers be used in the organic fiber layer.

The glass fibers may be any of the conventional glass fibers, for example, the conventional vitrious glass fibers, C-glass fibers, S-glass fibers, E-glass fibers, air filtration-grade glass fibers, "range" grade fibers and the like, which glass fibers may or may not have a sizing thereon, e.g. a polysiloxane sizing.

The denier of the organic fiber is preferably between about 1.5 and 25 denier, although more preferably that denier will be between about 2 and 15 deiner. The fiber length of the organic fiber may be from 1 to 4 inches, although more usually the fiber length will be between 1.5 and 3 inches.

The glass fiber will have an average diameter of from about 1 micron up to about 25 microns, although more usually those fibers will have a diameter of from about 5 microns up to about 15 microns. The length of the glass fibers can vary substantially, since they do not substantially participate in the needling step, and may have lengths shorter than 1 millimeter up to as much as 10 millimeters, although more usually the length will be between 1 millimeter and 10 millimeters.

In a composite fabric having only one layer of organic fibers and only one layer of glass fibers, the weight ratio of the two layers may vary considerably. This is because the glass fibers do not participate in the needling step, as opposed to the above discussed U.S. Pat. No. 3,975,565, where the layer of organic fibers has a small thicknesss compared with the thickness of the layer of inorganic fibers. This is a necessity in that patent, since the organic fiber layer cannot be sufficiently needled with only up to 260 needle punches per square inch to provide any substantial consolidation of the organic fibers, if the layer of organic fibers has appreciable thickness (and hence amount of fibers therein). Therefore, in the present invention, the ratio of the weight of the organic fibers to the weight of the glass fibers can be from 1:10 to 10:1, and still a very good fabric can be obtained, but more usually, that ratio will be between 1:5 and 5:1.

Figure 3:
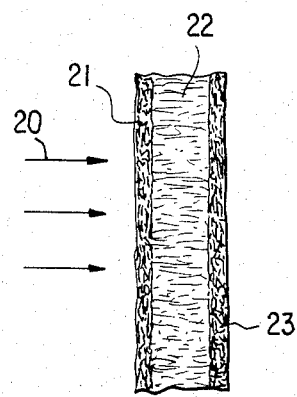
FIG. 3 is a diagrammatic illustration of a filter made of the present fabric.

Some variation in the ratio of glass fibers to organic fibers will be desirable depending upon the particular end product desired. Further, the choice of the organic fibers will vary with the end product desired. Also, whether or not the glass fiber layer is sandwiched between two organic fiber layers will vary with the end product desired. Also, whether or not the glass fiber layer is sandwiched between two organic fiber layers will vary with the end product desired. Other variations will be apparent from the discussion below. For example, when the end product is intended to be a filter media, such as an air make-up filter, a clean room filter, a boiler filter and the like, the glass fiber layer is the primary filtration layer and it is important that the glass fiber layer, which can achieve fine filtration, be near the surface which first encounters the particles to be filtered. Such a filter is diagrammatically illustrated in FIG. 3. Thus, a gas, e.g. air, to be filtered, shown by arrows 20, contacts a relatively thin organic fiber layer 21, which functions mainly as a containment for the glass fibers of glass fiber layer 22 and the essential filtration takes place by the glass fibers of the glass fiber layer 22. Additionally, simple for containment of the glass fibers, a second organic fiber layer 23 is provided for strength and containment, e.g. health, reasons.

Figure 4:
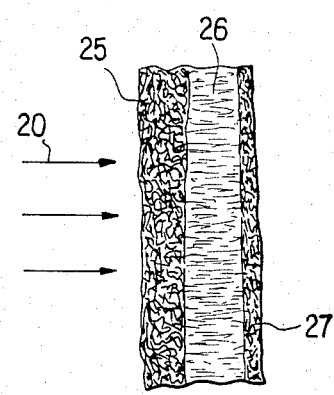
FIG. 4 is a diagrammatic illustration of another filter made of the present fabric.

FIG. 4 shows a variation where the gas to be filtered (shown by arrows 20) first contacts a relatively thick organic fiber layer 25 where substantial filtration occurs, especially of more coarse particles, and then contacts glass fiber layer 26 where additional fine particle filtration takes place. Again, an organic fiber layer 27 is used primarily for strength and containment of the glass fibers in glass fiber layer 26.

Figure 5:
FIG. 5 is a diagrammatic illustration of a heat insulator made of the present fabric.

FIG. 5 illustrates a further application of the fabric of the invention. In this application, the fabric is not used as a filter, but as a heat insulator, for example, as a heat insulator to be placed between the floor board of an automobile and the carpet of an automobile in the passenger compartment of an automobile, so as to protect the feet of the passenger from heat generated by a catalytic converter underneath the floor board. In this case, the organic fiber layer 30 is relatively thin, and functions mainly as a strength component and containment of the glass fibers of glass fiber layer 31. Glass fiber layer 31 may not need a further organic fiber layer for containment of the glass fibers, since in this particular example, glass fiber layer 31 would abut the metal floor board and would be contained thereby. However, it could have an additional organic fiber layer to sandwich the glass fiber layer 31.

The degree of needling in punches per square inch which approximately equates with the number of stitches per square inch of organic fibers passing through the glass fiber layer, affects the detachability of the organic fiber layer from the glass fiber layer. If the number of such stitches per square inch is not at least 700, then the layers are somewhat detachable from each other and the composite fabric is of lower physical properties. The term detachable, in this regard, means that the layers can detach from themselves in use, e.g. during flexing of a bag house filter made of the present fabric, or can be relatively easily manually detached by digitally tearing apart the layers. With about 700 stitches per square inch, the layers are substantially non-detachable, which means that the layers will not easily detached in either of the foregoing circumstances. However, to improve the non-detachability, it is preferred that the number of stitches per square inch be at least 1000, e.g. at least 2000 and for applications where substantially non-detachability is required, e.g. bag house filters, respirator filters, clean room filters, e.g. class 100 to class 1000, coal fired boilers filters, and the like, it is preferred that the stitches be at least 3000 per square inch, and more preferably 5000 to 8000 per square inch. As will be appreciated from the foregoing, a major feature of this invention is the ability to place such large numbers of stitches through the glass fiber layer without substantially reorienting the fibers of that glass fiber layer (which reorientation could affect filtration properties and heat insulation properties) and without substantially breaking or degrading the glass fibers of the glass fiber layer.

Turning now to the details of the needling process to achieve the above needling, the needling may be carried out in any of the conventional needle looms, either single acting or double acting looms, but it is preferred that the needling be carried out with a double acting loom (needling from both sides) when sandwiching organic fiber layers are used, and more particularly with the known FIBERWOVEN (Trademark) loom, which loom not only needles from both sides, but needles in increasing needle density needling stations and the needles penetrate the fabric at an angle to the plane of the fabric. This mode of needling, as achieved by a FIBERWOVEN loom, is the preferred embodiment of the invention, and the best known mode.

The needles may vary considerably, but the blade of the needles may be between about 20 and 40 gauge with a regular barb, although a "formed" barb is preferred (a formed barb is smoothed, whereby it is less damaging to glass fibers). The needles may be single barbed or multiple barbed needles, but it is preferred to that when multi-barbed needles are used no more than 3 or 4 barbs per side of the needle is present.

The organic fiber layer may be prepared by carding a batt of organic fibers by ordinary carding machines. The glass fiber layer may be prepared by conventional laying mechanisms, e.g. air laying or wet laying, but since glass batts of this nature are commercially available, it is more convenient simply to obtain those batts from a commercial source. The batt of organic fibers and the batt of glass fibers may be laid in parallel, or cross-laid (cross-lapped) or combinations thereof. Since the glass fiber layer will not be substantially disturbed during the needling operation, this allows some design of the fabric by means of the laying of the batts. For example, since commercial glass fiber batts tend to be oriented in the direction of manufacture, e.g. air direction in air laying, the cross-laying of two or more glass fiber batts will achieve more random orientation of the glass fibers for better filtration and insulation properties.

On the other hand, the particular carding operation of the organic fibers can be important, depending upon the intended application of the fabric. For example, the organic fiber batt to be needled into the organic fiber layer may be composed of multiple carded fibers where the last or top most carded fibers are of very fine denier. These fine denier fibers at the surface are not substantially picked up by the barbs of the needles during the needling operation, which would otherwise distribute the fine fibers throughout the organic fiber layer and through the stitches of the glass fiber layer, but instead leaves a layer of fine denier fiber relatively intact in its carded position. By maintaining the layer of fine fibers near the face surface or the needled fabric, the fine fibers disposed at or near the face surface greatly increase filtration efficiency and maintain face loading of a filtration fabric so that filtered particles can be easily dislodged therefrom, which is particularly important in bag house filters where dislodging of particles is by agitation. Nonetheless, there is sufficient needling of these fine fibers to intimately lock those fine fibers with the undercarded larger denier fibers in the organic fiber layer.

In order to provide the fabric of the present invention, as explained above in some detail, it is necessary to needle the fabric in such a manner that stitches of the organic fibers pass through the glass fiber layer, while at the same time the glass fiber layer is not substantially needled and left relatively undisturbed. It is an important feature of the invention and a most surprising discovery that such was even possible, when needling to the high number of needle punches per square inch required by the present fabric and especially when such needling is performed without substantially disturbing the glass fibers or breaking the glass fibers, as opposed to the experience disclosed in U.S. Pat. No. 3,975,565, discussed above. However, once this surprising discovery was made, it was determined that needling of such characteristics could be carried out in a number of different manners. The needling need only provide a combination of needling factors, especially the factors of fiber characteristics, fiber batt depth, needle barb size, number of barbs, needle barb penetration and needle barb configuration such that the barbs of the needles, and especially the first barb, are essentially fully loaded during passage through the organic fiber layer, or are loaded in a configuration, such that the fine diameter glass fibers cannot be substantially picked up by the needle barbs. While these factors admit to a great number of possible permutations, a selection of the possible permutations can be made such that with any particular groups of those factors, relatively few experiments will be required in order to find combinations of those factors which will produce the present needling. Thus, if a particular needle barb size and configuration is desired, for example, where the needle is already disposed in a conventional loom, then the particular organic fiber can be changed, or the denier of the fibers, or the length of the fibers, or the depth of the fiber batt can be changed until one of these combinations produces the present needling. On the other hand, if a particular organic fiber is desired, then the length of that fiber, the denier of that fiber, and the depth of the fiber batt can be changed until the present needling is achieved.

On the other hand, if a particular organic fiber of a certain denier and certain length is desired, then the barb configuration, size, depth and penetration, as well as the batt thickness can be changed until the present needling is achieved.

The only caveat to the foregoing is that in all cases, it is preferred that the needling be conducted in a manner where the initial stages of needling are designed such that less agressive needling takes place, and in successive stages of needling more agressive needling takes place. Those skilled in the art know how to design such increasing agressiveness of needling, but briefly stated, the agressiveness of needling depends upon prior compaction, e.g. roller compaction, of the batt to be needled, the number of needles displayed per square inch in a particular needling stage needling board, the size and configuration of the needle barb or barbs, and the depth of penetration of the needle barbs. Substantial compaction prior to needling is not normally either necessary or desirable and usually the compaction, e.g. by rollers, will be only to the extent of providing the batts in a thickness which is satisfactory for conveniently entering the first needling station of the particular looms being used.

Standard needle catalogues and like descriptions identify particular needle barb configurations for relative aggressiveness, especially toward different fibers and less aggressive needles may be easily chosen. However, usually the needles should not have more than 3 or 4 barbs along the blade of the needle on any one barb surface. For example, if a triangular blade needle is used, it should not have more than 3 or 4 barbs along each barbed edge of the triangled blade.

The barb configuration will normally be either a "regular" barb or a "formed+ barb, especially as opposed to the aggressive "projecting" barbs (which project from the blade), e.g. as illustrated in U.S. Pat. No. 3,608,166. Regular barbs are disposed primarily within the blade and formed barbs are likewise disposed but additionally smoothed to be less aggressive. Barb depths will generally be smaller as opposed to the large depths for needling coarse fibers.

The penetration of the first barb of the needle will be substantially through the batts being needled up to about 0.25 to 0.35 inch beyond the opposite side of the batts from that side that the needles enter the batts. Penetration much beyond this gives too aggressive needling, particularly in the earlier needling and with more agressive needles.

The display of needles in the needle boards affect the aggressiveness of needing. The greater the number of needles per square inch which penetrate the batt per stroke of a needle board, the more aggressive the needling. This is because more fibers are engaged by the larger number of needles during any one stroke and hence there is less fiber mobility and less opportunity for fibers to slip out of an engaging barb. With fewer numbers of needles per square inch per stroke, fiber mobility is greater and more fibers can slip out of engaging barbs, i.e. less aggressive needling. Likewise if the barbs are, for example, formed barbs, the fibers can more easily slip out of an engaging barb and less aggressive needling takes place. Accordingly, the present needling should be conducted with numbers of needles per square inch per stroke and/or barb configuration and/or barb penetrations where less aggressive needling takes place.

The foregoing may also be adjusted for the ultimate number of needle punches per square inch which is desired. Hence, if a lower density fabric is desired, e.g. as a heat insulator, then, for example, only 1000 needle punches per square inch may be used. This can be achieved in a single needling station (two opposed needle boards) of a FIBERWOVEN loom and all with the same needles. However, if a large number of needle punches per square inch is desired, e.g. for a bag house filter, then the number of needles per stroke in the earlier needling stages may be reduced with high numbers of needle punches per square inch in the latter needling stages. Alternatively, low aggressive needles may be used with the same numbers of needles in each needling stage and a large total number of needle punches is used to provide the required fiber intanglement for a strong fabric. For example, one or more FIBERWOVEN looms may be used with each needle board of the 4 needling stages substantially full of the same needles, and the present fabric will still result when low aggressive needles are used and the number of needle punches per square inch is at least 2000–3000 or more preferably 3000–4000.

All of the above is designed to produce the present type of needling. Basically this type of needling insures that the fiber engaging barbs of the needles are substantially loaded with organic fibers before penetrating the glass fiber layer or are so loaded with organic fibers that engaged glass fibers can easily slip out of the so loaded barbs. Thus, the glass fiber layer is substantially undisturbed during needling while the organic fiber layer is fully needled.

The resulting fabrics have a wide variety of uses. Thus, the fabric may be in the form of a filter, e.g. a bag house filter with organic fiber to glass fiber weight ratios of 4:1 to 12:1 or a breather filter with such ratios of 5:1 to 3:1, or an insulator, e.g. a heat insulator, with such ratios of 1:4 to 1:10. The fabric may also be in the form of a drapery material, heat protective clothing, and sound absorbing coverings.

The needled fabric may be sized or coated or filled or impregnated in a variety of manners as is common to the art. Thus, polytetrafluoroethylene sizes may be padded on and cured. Alternatively, polyacrylic sizings or other polymeric or natural sizings may be used. Fillers, e.g. kaolin, talc, etc. may be padded in the fabric. Coatings, e.g. polyethylene, acrylic and polyester coatings may be applied. Foam coatings, either in the expanded or crushed state, may be provided on the fabric. The fabric may be impregnated with a resin and cured to provide a more rigid structure, e.g. impregnated with an epoxie or polyester.

The surface of the fabric may be finished in conventional manners, e.g. calendering, glazing, heat singeing.

The glass layer may be placed in the batts for needling either alone or carried on a carrier, e.g. a light weight woven or non-woven scrim.

In addition the fabric may be combined with another fabric. For example, where a relatively thick fabric is desired, e.g. an insulating mat, the present fabric may be tacked to an inexpensive carrier fabric. e.g. a jute or cotton non-woven mat, or such a mat may be fed through the needling process and the present fabric and the mat are in situ attached. In lieu of a mat woven or knitted fabric may be used.

The invention is illustrated by the following examples, where all percentages and parts are by weight, unless otherwise specified, as is also the case in the foregoing disclosure and following claims.

EXAMPLE 1

Three carding machines carded 3 ounces per square yard each of poly(phenylene sulfide) staple fibers (Ryton PPS—Phillips Petroleum Co.) into a cross-lapped batt of 9 ounces per square yard total weight. The staple fibers were crimped, had an average length of about 2 inches and an average denier of about 3. Between the top and middle cards were fed a woven scrim of poly(phenylene sulfide) having 8 to 10 picks per inch and an open weave. The scrim carried about 1.8 ounces per square yard of Air Filtration grade 11 glass fiber batt (Johns-Manville). The carded staple fibers and the scrim carried glass fibers were collected and moved on a floor apron and an inclined apron to a series of three FIBERWOVEN needle looms, each with 4 needling stations and 2 needle boards per station. Each needle board was provided with relatively low aggressive FOSTER 3-40-4-A needles (40 blade gauge). The needle density per board was such that in traversing the three looms the resulting fabric had been needle punched about 6000 punches per square inch.

The resulting fabric had an overall bulk density of about 6 lbs. per cubic foot. The layer of glass fibers was sandwiched between a top thinner layer of poly(phenylene sulfide) fiber fabric (about 3 ozs. per square yard) and a thicker bottom layer of poly(phenylene sulfide) fiber fabric (almost 7 ozs. per square yard—including the scrim). The glass fiber layer was quite distinct and visually (side view) separate from the sandwiching fabric layers. The sandwiching fabric layers were quite difficult to manually tear from the glass fiber layers, and in attempting to manually separate these layers, it was visually observed that there were thousands of stitches of poly(phenylene sulfide) fibers through the glass fiber layer per square inch. There were essentially no glass fibers on the outer surfaces of the poly(phenylene sulfide) fibers layer. The glass fibers layer was essentially unneedled, except that there was substantially intertwining between the glass fiber layer and the two poly(phenylene sulfide) fibers layers.

The fabric was padded to 0.5% add-on with an aqueous fluoropolymer dispersion sizing (Teflon-B-PTFE-DuPont), cured in a heated oven at 400° F. for 4 minutes and calendered on hot cans at 400° F. with can pressure sufficient to reduce the thickness of the fabric to 65 mils. The surface of the fabric was smooth.

The cured fabric was tested for air permeability and had a Frazier of between 30 and 40 CFM. The smooth surface allowed collected "cake" to be easily released when used as a filter and the fluorocarbon sizing improves abrasion resistance, chemical resistance and flex endurance. The poly(phenylene sulfide) fibers (375° F.

working temperature, 400° F. intermittant temperature and H₂SO₄ resistant) allow this fabric to very satisfactorily function as a bag house filter for a coal fired boiler.

EXAMPLE 2

The procedure of Example 1 was repeated except that in lieu of the poly(phenylene sulfide) fibers, 2 inch, 3 denier, crimped polyester fibers were used, and no sizing was placed on the needled fabric. The fabric had a Frazier Air Permeability of between 40 and 50, but was otherwise similar to the fabric of Example 1 prior to sizing. This fabric functions satisfactorily as an air filter, or a prefiller for a clean room filter.

EXAMPLE 3

Two carding machines carded 1.5 ounces each of an aramid staple fibers (Nomex) on the apron system of Example 1 into cross-lapped batts. A batt of "range-type" glass fibers (Owen-Corning HT-26-K valve 26), with a weight of about 14 ounces per square yard, was fed between the carded batts of aramid fibers. These batts were needled in a FIBERWOVEN loom using FOSTER 5 needles which are less aggressive needles, and only one needling station to provide about 700 needle punches per square inch. The needled fabric was about 0.6 inch thick. The layers were not easily manually separated and the stitching described in Example 1 was observed. The fabric K-value was less than 0.26 at 24° C. and 0.31 at 93° C. The heat transfer from a 175° C. hot face gave a constant temperature of 110° C. on the cold face. The glass fiber layer was essentially undisturbed, but the aramid fiber layer was satisfactorily strong.

This insulator fabric functioned satisfactorily as a heat insulator between the carpet and metal floor board of an automobile when placed over the catalytic converter and essentially no glass fibers were on the outer surface of the aramid fiber layer.

EXAMPLE 4

Two carding machines carded 3 ounces per square yard each of 6 denier, 2 inches, crimped polyester fibers on the apron system of Example 1 into a cross-lapped batt. Between the two cards was fed 1.8 ounces per square yard of Air Filtration grade 11 glass fiber batt (Johns-Manville) carried on a spun bonded polyester scrim. The needling of Example 3 was repeated except that two such needling stations were used and the fabric was needle punched about 1400 punches per square inch. The glass fiber layer was essentially unneeded but the polyester fiber layer was needled into a relatively strong layer with essentially no glass fibers on its outer surface.

The fabric functioned satisfactorily as an ASHRAE Type Air Filter (American Society of Heating Refrigeration and Airconditioning Engineers).

EXAMPLE 5

A batt was prepared from approximately 3 ounces per square yard of the polyester fibers of Example 1 and approximately 3 ounces per square yard of the glass fibers of Example 3. Needling of the batt was performed in a single station of a FIBERWOVEN loom with only one needle board in the station and with the needles of Example 1 to achieve approximately 700 needle punches per square inch. In test A the needling was from the glass fiber batt and in test B the needling was from the polyester fiber batt. The fabric which resulted from test A, could be easily manually torn apart with only the lightest pull at the interface of the glass and polyester fibers layers. The stitches of glass fibers into the polyester layer were weak (partially broken fibers) and glass fibers (partially broken) were on the outside surface of the polyester layer. The fabric was not satisfactory.

In test B, the needling was the same as test A, but from the polyester fiber layer. The glass and polyester fiber layers could be torn apart manually only with a significant pull and there were no glass fibers on the outside surface of the polyester layer. This relatively lightly needled fabric is quite satisfactory for some purposes, e.g. lightly stressed filters.

It is claimed:

1. An integral textile composite fabric of non-woven, needled textile fibers comprising:
   (a) at least one organic textile fiber layer of laid and needled textile organic fibers, said layer having an inner and an outer surface;
   (b) at least one glass fiber layer of laid and needled glass fibers, said layer having an inner and outer surface;
   (c) a plurality of first needled stitches composed essentially of said organic fibers from said one organic fiber layer needled in and disposed substantially through said one glass fiber layer while the fibers of the said glass fiber layer are substantially undisturbed, whereby the said stitches bind the said layers together at their inner surfaces, the said layers are substantially non-detachable from each other and form an integral textile composite fabric having substantially uniform and high physical properties, and wherein there are at least 700 stitches per square inch of said binding stitches passing through said one glass fiber layer and wherein said one organic fiber layer is essentially free, at least on the outer surface thereof, of glass fibers displaced from said one glass fiber layer.

2. The fabric of claim 1 wherein an additional organic fiber layer of needled textile organic fibers having an inner and an outer surface is disposed with its inner surface adjacent the said outer surface of said one glass fiber layer, and the said stitches are also so disposed in said additional organic fiber layer so that said additional organic fiber layer is likewise bound to the outer surface of said one glass fiber layer.

3. The fabric of claim 2 where a plurality of additional stitches composed essentially of organic fibers from said additional organic fiber layer are needled in and disposed substantially through said one glass fiber layer so that said additional organic fiber layer is bound to said one glass fiber layer at the said outer surface of the said one glass fiber layer and said inner surface of said additional organic fiber layer, the said one glass fiber layer and the said additional fiber layer being substantially non-detachable from each other and form an integral textile composite with all of said layers having substantially uniform and high physical properties, and wherein said additional stitches constitute at least a significant portion of the said 700 stitches per square inches passing through said one glass fiber layer, and wherein said additional organic fiber layer is essentially free, at least on the outer surface thereof, of glass fibers displaced from said one glass fiber layer.

4. The fabric of claim 3 wherein the said first stiches pass at least substantially through said additional organic fiber layer and said additional stitches pass at least substantially through said one organic fiber layer.

5. The fabric of claim 1 wherein one or more further layers of glass fibers and/or organic fibers are disposed adjacent to the outer surface of the one glass fiber layer and said further layers likewise have said stitches passing therethrough.

6. The fabric of claim 2 wherein one or more further layers of glass fibers and/or organic fiber are disposed between said one organic fiber layer and said additional organic fiber layer and likewise have said stitches passing therethrough.

7. The fabric of claim 1 wherein the amount of stitches is at least 1000.

8. The fabric of claim 2 wherein the amount of stitches is at least 1000.

9. The fabric of claim 3 wherein the amount of stitches is at least 1000.

10. The fabric of claim 1 in the form of a filter.

11. The fabric of claim 10 wherein the weight ratio of organic fiber to glass fiber is 4:1 to 12:1.

12. The fabric of claim 11 in the form of a bag house filter.

13. The fabric of claim 1 in the form of an insulator.

14. The fabric of claim 13 wherein the weight ratio of organic fiber to glass fiber is 1:4 to 1:10.

15. The fabric of claim 14 in the form of a heat insulator.

16. The fabric of claim 10 wherein the weight ratio of organic fibers to glass fibers is 5:1 to 3:1.

17. The fabric of claim 16 in the form of a breathing filter.

18. The fabric of claim 1 which has one or more of a coating thereon, a sizing thereon, a filler therein and an impregnating resin therein.

19. The fabric of claim 1 attached to a carrier fabric.

20. The fabric of claim 1 having a surface finish.

21. A process for the production of the fabric of claim 1, comprising:
   (1) preparing a laid glass fiber batt of said glass fibers;
   (2) preparing a laid organic fiber batt of said organic fibers;
   (3) placing the said batts adjacent to each other to form a composite batt;
   (4) needling said composite batt at least from the organic fiber layer with at least 700 needle punches per square inch whereby stitches composed essentially of said organic fibers from said organic fiber layer are needled in and disposed substantially through said glass fiber layer while the fibers of the said glass fiber layer are substantially undisturbed, whereby the said stitches bind the said layers together at their inner surfaces;
   and wherein said needling is such that the organic fiber layer is needled and entangled into a strong layer but said glass fiber layer is substantially undisturbed.

22. The process of claim 21 wherein there are more than one organic fiber layers.

23. The process of claim 22 wherein the organic fiber layers sandwich the glass fiber layer.

24. The process of claim 23 wherein there are more than one glass fiber layer.

25. The process of claim 21 wherein the aggressiveness of the needling is such that said glass fiber layer is substantially undisturbed during said needling.

26. The process of claim 25 wherein the aggressiveness of the needling is provided by one of more of the needle barb size, depth, configuration and penetration and organic fiber length, denier and composition.

* * * * *